United States Patent
Kamai et al.

(10) Patent No.: US 10,390,133 B2
(45) Date of Patent: Aug. 20, 2019

(54) SOUND COLLECTION APPARATUS

(71) Applicant: Panasonic Intellectual Property Management Co., Ltd., Osaka (JP)

(72) Inventors: Takahiro Kamai, Kyoto (JP); Tomokazu Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/796,975

(22) Filed: Oct. 30, 2017

(65) Prior Publication Data

US 2018/0070172 A1 Mar. 8, 2018

Related U.S. Application Data

(63) Continuation of application No. PCT/JP2016/004373, filed on Sep. 28, 2016.

(30) Foreign Application Priority Data

Mar. 25, 2016 (JP) .................................. 2016-061239

(51) Int. Cl.
*H04R 3/00* (2006.01)
*G06F 3/16* (2006.01)
*H04R 1/40* (2006.01)

(52) U.S. Cl.
CPC ............... *H04R 3/005* (2013.01); *G06F 3/16* (2013.01); *G06F 3/165* (2013.01); *H04R 1/406* (2013.01); *H04R 2499/15* (2013.01)

(58) Field of Classification Search
None
See application file for complete search history.

(56) References Cited

U.S. PATENT DOCUMENTS

| 2005/0007445 A1 | 1/2005 | Foote et al. | |
| 2007/0040903 A1* | 2/2007 | Kawaguchi | H04N 7/147 348/14.08 |

(Continued)

FOREIGN PATENT DOCUMENTS

| JP | 2005-33811 | 2/2005 |
| JP | 2011-151621 | 8/2011 |
| JP | 2011-211330 | 10/2011 |

OTHER PUBLICATIONS

Hantronix, "An explanation of LCD viewing angle." 2000. pp. 1-2. http://www.hantronix.com/files/down/v-angle.pdf.*

(Continued)

*Primary Examiner* — Qin Zhu
(74) *Attorney, Agent, or Firm* — Wenderoth, Lind & Ponack, L.L.P.

(57) ABSTRACT

The disclosure provides a sound collection apparatus in which a user can easily find a sound collection direction, and furthermore, can readily control the sound collection direction. A sound collection apparatus comprises: an operation unit capable of visually indicating one direction and three-dimensionally and sequentially varying the direction; a sound collection unit that provides directivity for sound collection; and a control unit. The control unit includes a direction detection unit for detecting a direction indicated by the operation unit. The control unit controls the collection directivity of the sound collection unit according to the direction detected by the direction detection unit. The sound collection unit includes a plurality of microphones. The control unit further includes a beam forming production unit for controlling a beam by a microphone array including the plurality of microphones according to the direction detected by the direction detection unit to vary collection sound directivity.

6 Claims, 8 Drawing Sheets

(56) References Cited

U.S. PATENT DOCUMENTS

| | | | | |
|---|---|---|---|---|
| 2010/0329479 A1* | 12/2010 | Nakadai | ............... | B25J 9/00 |
| | | | | 381/92 |
| 2011/0176691 A1 | 7/2011 | Yoshitomi | | |
| 2012/0113210 A1* | 5/2012 | Kim | ............... | H04N 7/147 |
| | | | | 348/14.04 |
| 2012/0288126 A1* | 11/2012 | Karkkainen | ............... | H04R 3/005 |
| | | | | 381/309 |
| 2013/0300648 A1* | 11/2013 | Kim | ............... | G06F 3/011 |
| | | | | 345/156 |
| 2014/0278385 A1* | 9/2014 | Fan | ............... | G02C 11/10 |
| | | | | 704/226 |
| 2015/0331490 A1* | 11/2015 | Yamada | ............... | G06F 3/017 |
| | | | | 345/156 |
| 2015/0341734 A1* | 11/2015 | Sherman | ............... | H04R 25/407 |
| | | | | 381/92 |
| 2017/0034474 A1* | 2/2017 | Goto | ............... | H04N 7/147 |
| 2017/0188140 A1* | 6/2017 | Duzinkiewicz | ............... | H04R 3/005 |
| 2017/0206900 A1* | 7/2017 | Lee | ............... | G10L 15/08 |
| 2017/0293272 A1* | 10/2017 | Jeong | ............... | G06F 3/0412 |
| 2018/0136724 A1* | 5/2018 | Peana | ............... | G06F 3/013 |

OTHER PUBLICATIONS

International Search Report dated Dec. 13, 2016 in International (PCT) Application No. PCT/JP2016/004373.
International Preliminary Report on Patentability dated Sep. 25, 2018 in International (PCT) Application No. PCT/JP2016/004373.

* cited by examiner

SOUND COLLECTION APPARATUS

TECHNICAL FIELD

The present disclosure relates to a sound collection apparatus.

BACKGROUND

Japanese Laid-open Patent Publication No. 2011-151621 discloses an IC recorder that facilitates operation for designating directions so as to control sound directivity. This IC recorder includes: a direction accepting unit for accepting the designation of any one of three directions, that is, the right, left, and center, when any one of right, left, and upper buttons out of vertical and lateral keys in a cross arrangement is depressed; a display control unit for allowing a plurality of characters indicating the three directions, that is, the right, left, and center, respectively, to be output onto an LCD; a plurality of microphones arranged at predetermined distances apart from each other; and a directivity control unit for controlling sound directivity obtained by each of the plurality of microphones, based on the accepted direction. The display control unit highlights a character corresponding to the accepted direction more than other characters, and then, displays it on the LCD. This facilitates operation for designating a direction so as to control the sound directivity.

SUMMARY

The present disclosure provides a sound collection apparatus in which a user can easily find a sound collection direction, and furthermore, can readily control the sound collection direction.

A sound collection apparatus in the present disclosure includes: an operation unit capable of visually indicating one direction and three-dimensionally and sequentially varying the direction; a sound collection unit that provides directivity for sound collection; and a control unit, wherein the control unit includes a direction detection unit for detecting a direction indicated by the operation unit and the control unit controls the collection directivity of the sound collection unit according to the direction detected by the direction detection unit.

The sound collection apparatus in the present disclosure can definitely present an optimum sound collection direction having improved directivity for a user. Moreover, a user can optimally control the sound collection direction in the sound collection apparatus in the present disclosure with ease.

DESCRIPTION OF EMBODIMENTS

Embodiments will be appropriately explained below in detail with reference to the drawings. Here, detailed explanation more than necessary may be omitted. For example, detailed explanation of matters that have been already well known or duplicate explanation of substantially identical constituents may be omitted. This avoids unnecessary redundancy of explanation below, and enables one skilled in the art to easily understand the present disclosure.

Incidentally, the present inventor(s) present(s) the attached drawings and explanations below in order to enable one skilled in the art to sufficiently understand the present disclosure, and do(es) not intend to restrict the subject matter recited in claims.

(Circumstances Leading to Present Disclosure)

Since an opportunity to use voice recognition systems or automatic language translation systems in noisy surrounding environment has increased, higher directivity has been required for sound collection apparatuses provided for the voice recognition systems or the automatic language translation systems.

In view of this, there has been known a beam forming technique for improving directivity by the use of a microphone array including a plurality of microphones. The microphone array has advantages of increasing the freedom degree of a shape such as a shape that enables flat arrangement of a plurality of microphones (see, for example, Japanese Laid-open Patent Publication No. 10-126876), unlike a shape projecting toward a speaker in a conventional super-directivity microphone, as well as achieving sharp directivity.

In the meantime, it is difficult for users who are familiar with normal microphones to find a sound collection direction from the outside. In other words, a sound collection apparatus utilizing a conventional microphone array does not specifically, particularly, three-dimensionally show an optimum sound collection direction having improved directivity to users.

Moreover, it is desirable that the optimum sound collection direction of the sound collection apparatus should follow the movement of a user himself/herself. However, a user cannot operate the sound collection apparatus utilizing a conventional microphone array three-dimensionally, sequentially, and instantly in such a manner as to allow it to follow his/her movement.

In view of the above-described circumstances, the present disclosure has been accomplished. That is to say, the present disclosure provides a sound collection apparatus whose optimum sound collection direction can be easily found by a user. In addition, the present disclosure provides a sound collection apparatus in which a user can optimally control a sound collection direction with ease.

First Embodiment

A description will be given below of a first embodiment with reference to FIGS. 1 to 4.

[1-1. Configuration]

Figure 1A:
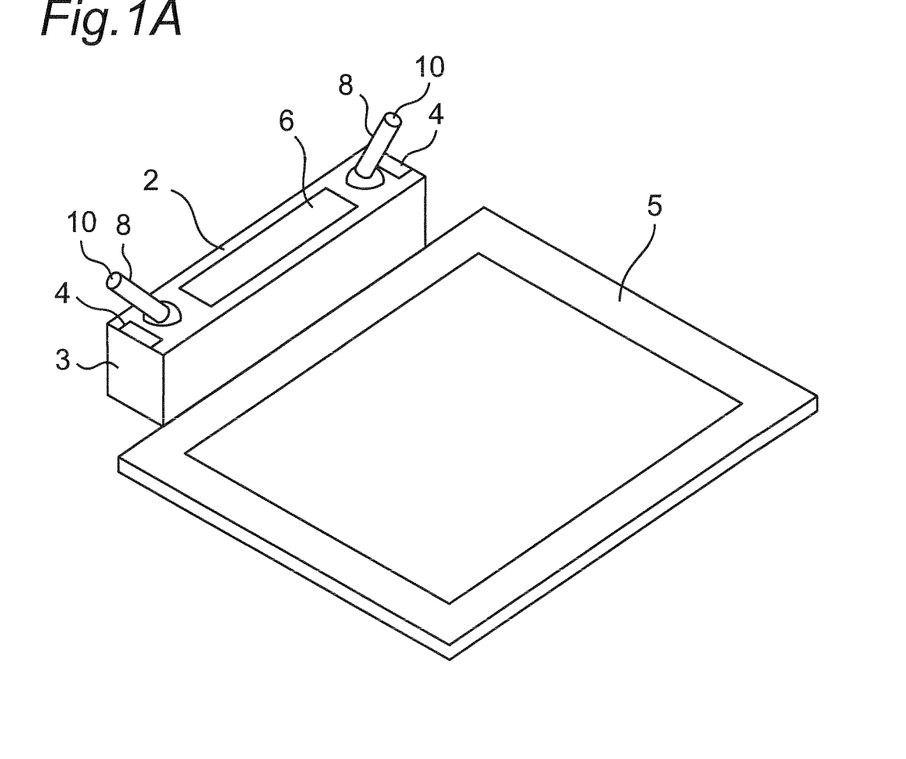
FIG. 1A is a perspective view showing a constitutional example of a voice recognition system utilizing a sound collection apparatus in a first embodiment.
Figure 1B:
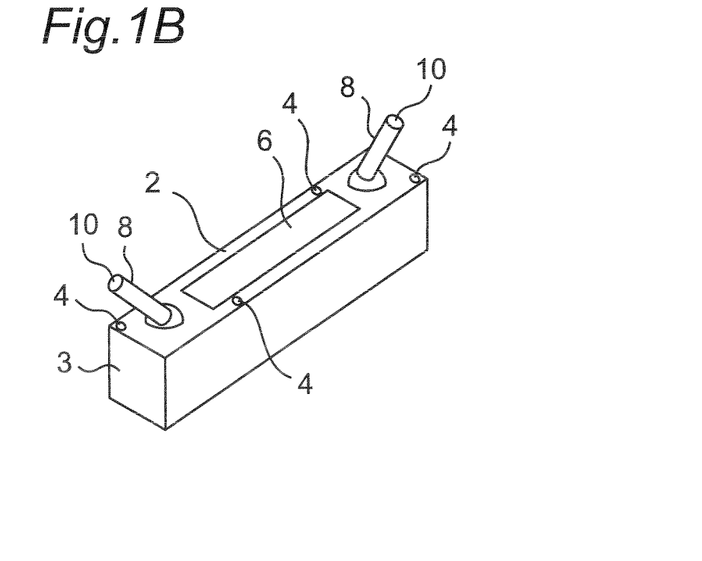
FIG. 1B is a perspective view showing another constitutional example of the sound collection apparatus in the first embodiment.

FIG. 1A is a perspective view showing a constitutional example of a voice recognition system utilizing a sound collection apparatus 2 in a first embodiment. The voice recognition system shown in FIG. 1A includes the sound collection apparatus 2 and a terminal 5. The terminal 5 is exemplified by a tablet terminal, a personal computer, a smartphone, a PDA or the like. Data is transmitted or received between the sound collection apparatus 2 and the terminal 5 via, for example, wireless communications utilizing WiFi or Bluetooth (trademark) standard or wire communications using, for example, a LAN cable.

The sound collection apparatus 2 is provided with two sound collection units 4 opposite to each other, two operation units 8 opposite to each other, and a speaker 6. One of the sound collection units 4 and one of the operation units 8 are disposed near either end of the sound collection apparatus 2. The operation of this voice recognition system is presumed such that each of two users allows his/her voice to be picked up by the sound collection unit 4 near one sound collection unit 4 and one operation unit 8. The voice picked up by the sound collection unit 4 is converted into data, which is then transmitted to the terminal 5, followed by processing. The processed data is transmitted to the sound collection apparatus 2, to be then converted into a voice, which is then output from the speaker 6.

Here, the positions at which the sound collection units 4 are arranged are not limited to those shown in FIG. 1A. For example, the sound collection units 4 may be positioned in a sound collection apparatus 2 in another constitutional example shown in FIG. 1B.

The terminal 5 performs the processing of translating, for example, Japanese voice data into English voice data, or vice versa.

Here, a system utilizing the sound collection apparatus 2 in the first embodiment is not limited to the voice recognition system shown in FIG. 1A. The sound collection apparatus 2 in the first embodiment can be used in any systems that use a voice picked up by a microphone.

Figure 2:
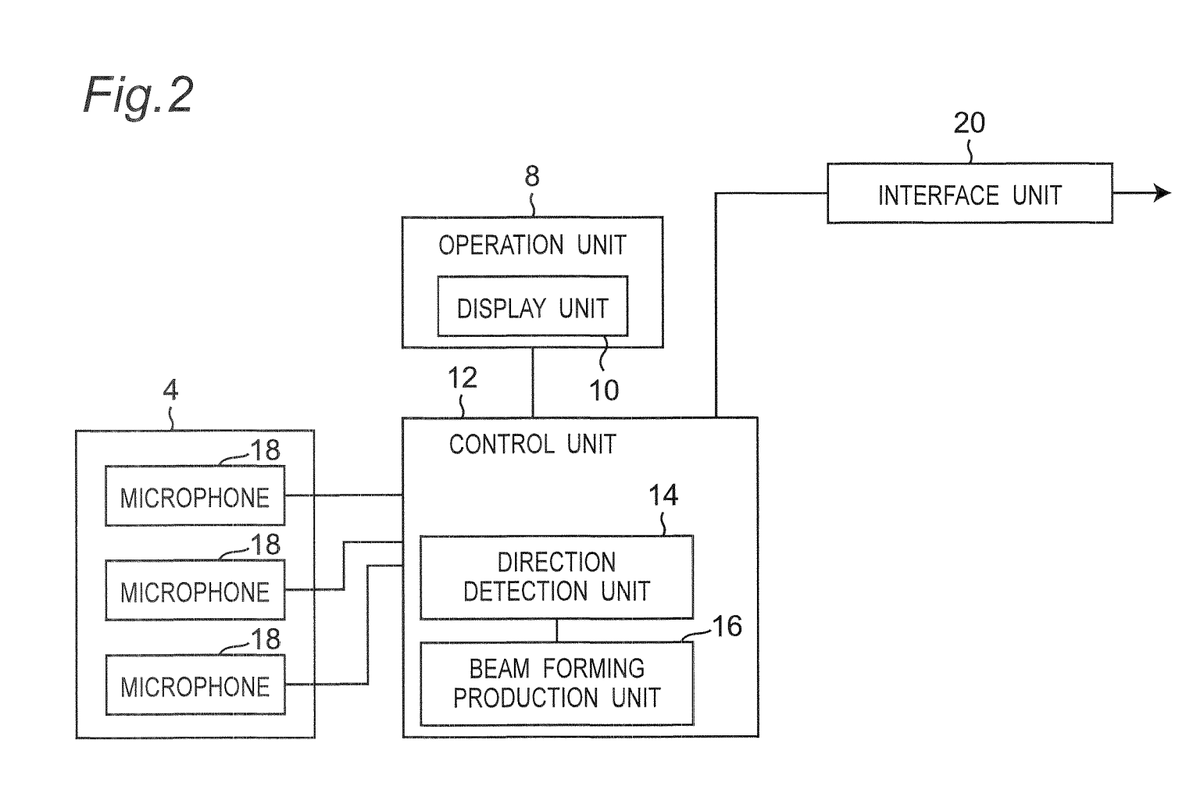
FIG. 2 is a block diagram partly illustrating the sound collection apparatus in the first embodiment, the block being relevant to sound collection in the sound collection apparatus.
Figure 3A:
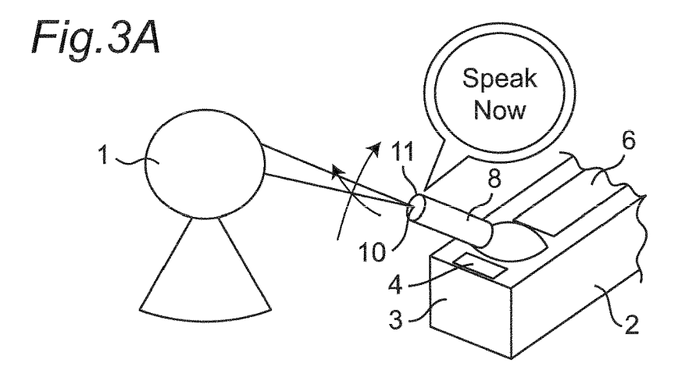
FIG. 3A is a view showing an example in which one side of the sound collection apparatus in the first embodiment is used.

FIG. 2 is a block diagram illustrating the sound collection apparatus 2 in the first embodiment. The block diagram of FIG. 2 illustrates a block relevant to sound collection in the sound collection apparatus 2. FIG. 3A is a view showing an example in which one side of the sound collection apparatus 2 in the first embodiment is used. As illustrated in FIG. 2, the sound collection apparatus 2 is provided with the operation unit 8, the sound collection unit 4, an interface unit 20, and a control unit 12.

The control unit 12 is exemplified by a CPU or an MPU, and executes a predetermined control program stored in a data storage unit, not shown, so as to fulfill a predetermined function. Moreover, the control unit 12 may be implemented by only a hardware circuit that is designed to fulfill a predetermined function. As a consequence, the control unit 12 may be exemplified by not only a CPU or an MPU but also a DSP, an FPGA, or an ASIC.

As shown in FIG. 3A, the operation unit 8 is formed in a shape obtained by combining a trackball 7 with a cylinder 9. The operation unit 8 is configured such that a user 1 grasps the cylinder 9 and rotationally moves the trackball 7 so that the cylinder 9 is freely disposed in a three-dimensional and sequential manner within an upper hemisphere with respect to the center of the trackball 7. The operation with respect to the operation unit 8 is converted into the rotations of, for example, two cylindrical members or disk members in contact with the trackball 7 in two directions at right angles within the sound collection apparatus 2. A direction detection unit 14, described later, (in the control unit 12) is adapted to detect these rotational amounts so as to detect the direction of the operation unit 8.

Additionally, the operation unit 8 is provided with a display unit 10 near a tip 11 of the cylinder 9. The display unit 10 is exemplified by a light emitting member such as an LED, a display such as a liquid crystal display or an organic EL display for displaying a fine image, or a minute mark formed of a phosphor. Moreover, the display unit 10 is configured such that a predetermined display content can be visually recognized with correction, as viewed by the user 1 in the direction of the operation unit 8, that is, in the axial direction of the cylinder 9.

Furthermore, the control unit 12 is provided with the direction detection unit 14 for detecting the direction of the operation unit 8 and a beam forming production unit 16 for producing directivity at a microphone array. The sound collection unit 4 includes a microphone array having a plurality of microphones 18. The interface unit 20 is a module for connecting the control unit 12 to external equipment, and performs data communications with the external equipment in conformity with a predetermined interface standard of a USB (Universal Serial Bus), an HDMI (trademark) (High Definition Multimedia Interface), WiFi, or the like. Data on a voice picked up by the sound collection unit 4 is output to the outside (e.g., the terminal 5) from the interface unit 20.

Figure 3B:
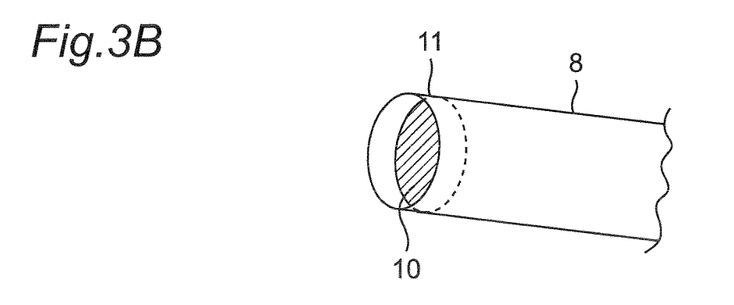
FIG. 3B is a view showing a constitutional example of the tip of an operation unit in the sound collection apparatus in the first embodiment.

Here, the display unit 10 in the operation unit 8 may be disposed at a position considerably recessed inward of the tip 11, as shown in FIG. 3B. When the display unit 10 in the operation unit 8 may be disposed at a position considerably recessed inward of the tip 11 in the above-described manner, a range is more narrowed in a direction in which a predetermined display content is visually recognized on the display unit 10 with correction. At this time, the direction in which a predetermined display content is visually recognized on the display unit 10 with correction, that is, a direction of the user 1 facing the operation unit 8 in the sound collection apparatus 2 tends to more accord with a direction (the directivity) of a beam produced by the beam forming production unit 16, as described later.

[1-2. Operation]

Figure 4:
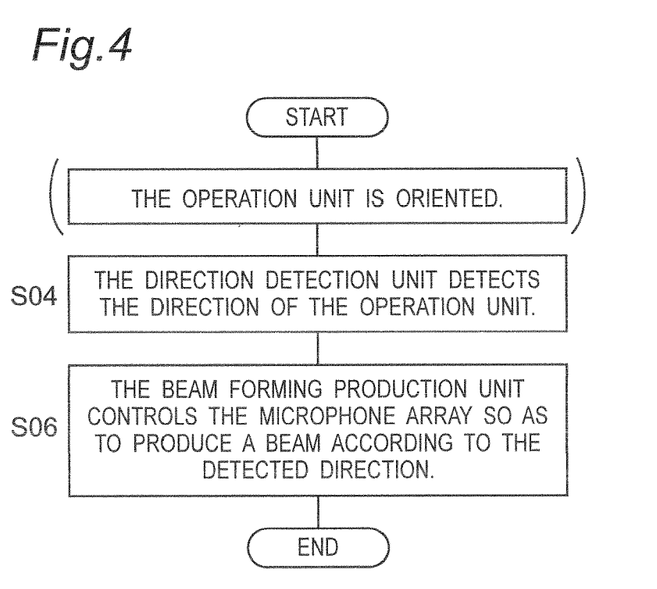
FIG. 4 is a flowchart illustrating operations from directing by the operation unit to producing a beam having high directivity in the sound collection apparatus in the first embodiment.

FIG. 4 is a flowchart illustrating operations from directing by the operation unit 8 to producing a beam having high directivity in the sound collection apparatus 2 in the first embodiment. Explanation will be made on the operation of the sound collection apparatus 2 with reference to FIG. 4.

First, the operation unit 8 is oriented by the operation of the user 1. As described above, the display unit 10 is configured such that a predetermined display content can be visually recognized with correction, as viewed by the user 1 in the direction of the operation unit 8, that is, in the axial direction of the cylinder 9. Consequently, the user 1 operates the direction of the operation unit 8 in such a manner as to visually recognize a predetermined display content on the display unit 10 with correction (see FIG. 3A). In this manner, a proper sound collection direction, which is described later, is determined.

The direction detection unit 14 in the control unit 12 detects the direction of the operation unit 8 (S04). The cylinder 9 of the operation unit 8 operated has a position indicating one direction within a virtual upper hemisphere with respect to the center of the trackball 7. The direction detection unit 14 detects one direction within the hemisphere. As described above, operation for orienting the operation unit 8 is converted into, for example, the rotations of the two cylindrical members in contact with the trackball 7 at the operation unit 8 in the two directions at right angles, and then, the direction detection unit 14 detects these rotational amounts so as to detect the direction of the operation unit 8. The direction detection unit 14 may be designed to detect the direction of the operation unit 8 with a configuration different from that described above.

The beam forming production unit 16 in the control unit 12 controls the microphone array so as to produce a beam according to the direction detected by the direction detection unit 14 (S06). Specifically, the beam forming production unit 16 controls the microphone array in such a manner as to improve a picked-up sound directivity in the direction detected by the direction detection unit 14. This enables the direction of a speaker (user) 1 with respect to the operation unit 8 and the display unit 10 in the sound collection apparatus 2 to substantially accord with the direction of the beam produced by beam forming.

The beam forming is achieved by a technique disclosed in, for example, Japanese Laid-open Patent Publication No. 2009-130908.

Subsequent to step S06, the sound collection unit 4 including the microphone array picks up a voice of the speaker (user) 1. The picked-up voice is converted into data by the control unit 12, and then, is output to the outside via the interface unit 20.

As described above, the voice of the speaker is picked up via the microphone having improved directivity by a simple operation.

[1-3. Effects and the Like]

As described above, in the present embodiment, the sound collection apparatus 2 is provided with: the operation unit 8 capable of visually indicating one direction and three-dimensionally and sequentially varying the direction; the sound collection unit 4 providing the directivity for sound collection; and the control unit 12. The control unit 12 includes the direction detection unit 14 for detecting the direction indicated by the operation unit 8. The control unit 12 controls picked-up sound directivity of the sound collection unit 4 according to the directions detected by the direction detection unit 14.

In this manner, the sound collection apparatus 2 provides the optimum sound collection direction that is understandable by the user 1. The user 1 can face in a proper direction. Moreover, the user 1 can optimally operate the sound collection direction with ease.

Additionally, in the present embodiment, the sound collection unit 4 includes the plurality of microphones, and furthermore, the control unit 12 includes the beam forming production unit for controlling a beam by the microphone array having the plurality of microphones according to the directions detected by the direction detection unit 14, so as to vary the picked-up sound directivity.

In this manner, the sound collection apparatus 2 provided with the sound collection unit 4 forming the microphone array readily provides the user 1 with the optimum sound collection direction. Moreover, the user 1 can optimally operate the sound collection direction with ease.

Additionally, in the present embodiment, the operation unit 8 has the display unit 10 that is visually recognized only in the direction indicated by the operation unit 8. This enables the direction of the user 1 facing the operation unit 8 and the display unit 10 in the sound collection apparatus 2 to more accord with the direction of the beam (directivity) by the microphone array with ease.

Using the present embodiment, the speaker (the user) can pick up his/her own voice with reduced surrounding noise.

Second Embodiment

A description will be given below of a second embodiment with reference to FIGS. 5 to 7.

[2-1. Configuration]

A sound collection apparatus 2 according to the second embodiment is also a sound collection apparatus utilized in the voice recognition system, as shown in FIG. 1A.

Figure 5:
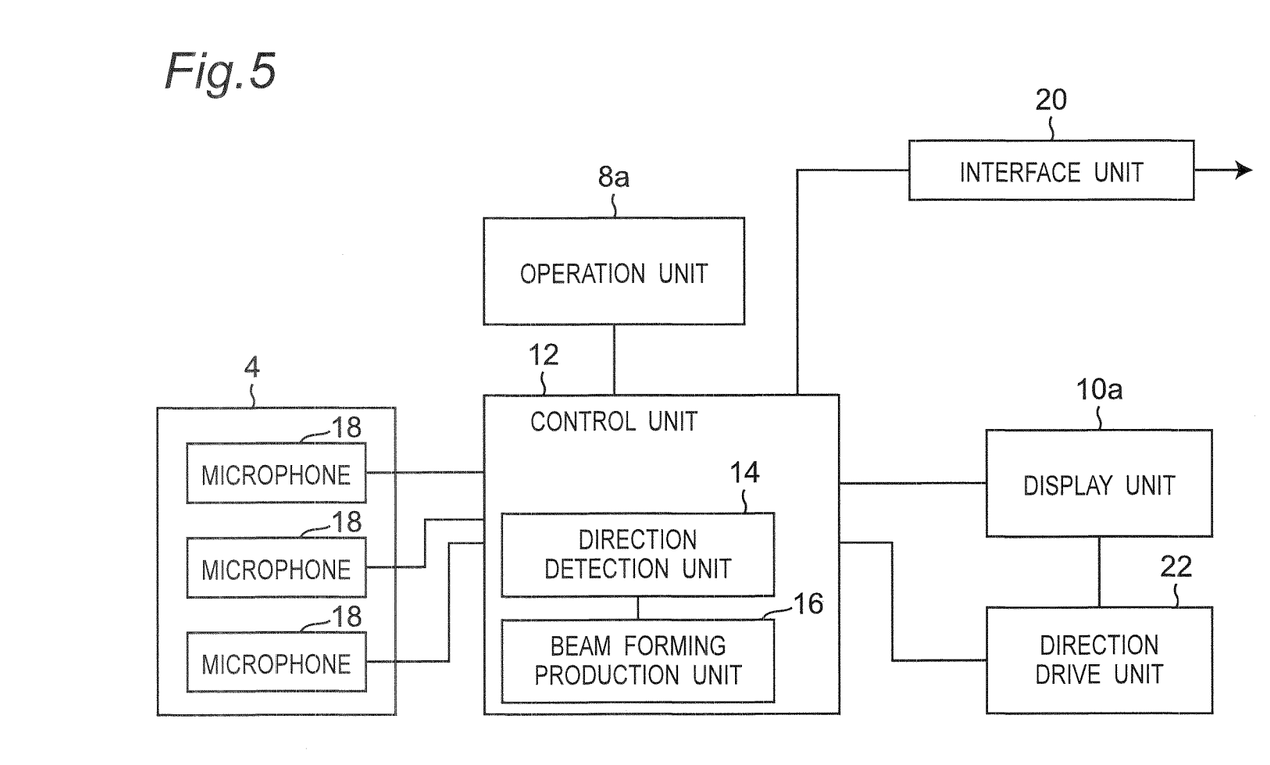
FIG. 5 is a block diagram partly illustrating a sound collection apparatus in a second embodiment, the block being relevant to sound collection in the sound collection apparatus.

FIG. 5 is a block diagram illustrating the sound collection apparatus 2 in the second embodiment, the block being relevant to sound collection in the sound collection apparatus 2. FIG. 6A is a view showing an example in which one side of the sound collection apparatus 2 in the second embodiment is used. As shown in FIG. 5, the sound collection apparatus 2 is provided with an operation unit 8a, a sound collection unit 4, a display unit 10a, a direction drive unit 22, an interface unit 20, and a control unit 12.

Figure 6A:
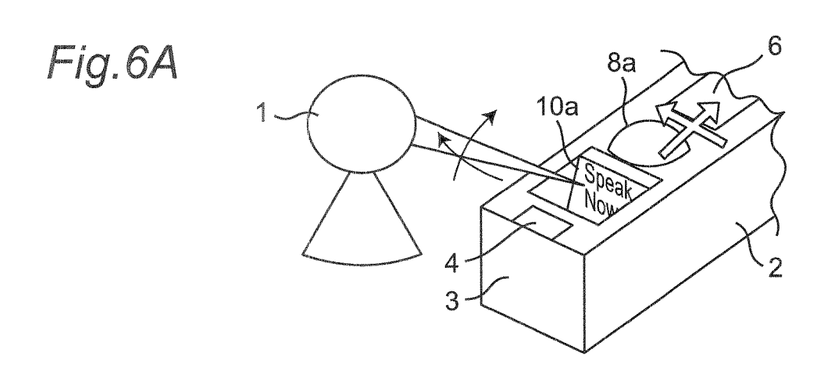
FIG. 6A is a view showing an example in which one side of the sound collection apparatus in the second embodiment is used.

As shown in FIG. 6A, the operation unit 8a has a spherical shape (e.g., a trackball). When a user 1 rotationally moves a spherical portion, the spherical portion is sequentially rotated back and forth and right and left so as to freely orient the operation unit 8a.

The display unit 10a is provided right near the operation unit 8a. The display unit 10a is exemplified by a light emitting member such as an LED, a rectangular flat plate for putting a fine mark by a phosphor, or a liquid crystal display or organic EL display for displaying a fine image.

Moreover, when the display unit 10a is driven by a direction drive unit 22, its orientation is varied. The direction drive unit 22 drives the display unit 10a so as to vary the orientation of the display unit 10a according to the direction of the operation unit 8a detected by a direction detection unit 14.

More specifically, the operation of the operation unit 8a is converted into the rotations of, for example, two cylindrical members or disk members in contact with a spherical member (a trackball) in two directions at right angles within the sound collection apparatus 2. The direction detection unit 14 detects these rotational amounts so as to detect the direction of the operation unit 8. When a motor, for example, included in the direction drive unit 22 is actuated based on the detected direction of the operation unit 8a, the change in direction of the display unit 10a is controlled. The direction drive unit 22 may include another type of actuator.

Here, the operation unit 8a is not always the spherical member (the trackball). For example, the operation unit 8a may be exemplified by a lever, a stick, a touch pad, or a handle capable of indicating a direction.

The control unit 12 is provided with the direction detection unit 14 for detecting the direction of the operation unit 8a and a beam forming production unit 16 for producing directivity at a microphone array. The sound collection unit 4 includes a microphone array having a plurality of microphones 18. Data on a voice picked up by the sound collection unit 4 is output to the outside (e.g., the terminal 5) from the interface unit 20.

[2-2. Operation]

Figure 7:
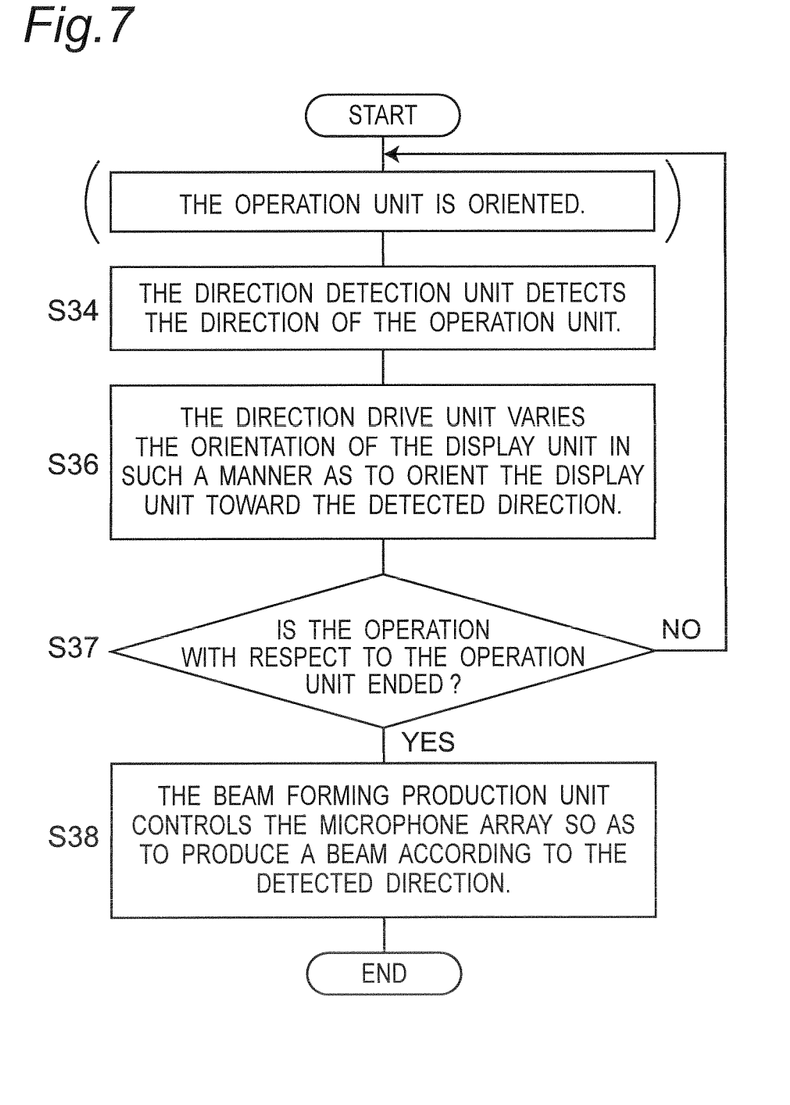
FIG. 7 is a flowchart illustrating operations from directing by the operation unit to producing a beam having high directivity in the sound collection apparatus in the second embodiment.

FIG. 7 is a flowchart illustrating operations from directing by the operation unit 8a to producing a beam having high directivity in the sound collection apparatus 2 in the second embodiment. Explanation will be made on the operation of the sound collection apparatus 2 with reference to FIG. 7.

First, the operation unit 8a is oriented by the operation of the user 1. In other words, the spherical member (the trackball) of the operation unit 8a operated is sequentially rotated back and forth and right and left so as to be freely oriented.

The direction detection unit 14 in the control unit 12 detects the direction of the operation unit 8a (S34).

The direction drive unit 22 varies the orientation of the display unit 10a in such a manner as to orient the display unit 10a toward the direction of the operation unit 8a detected by the direction detection unit 14 (S36).

Figure 6B:
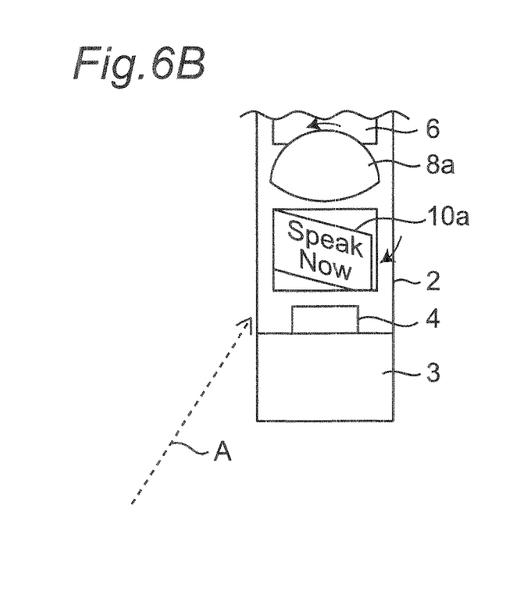
FIG. 6B is a view showing an operational example of a display unit that is moved by a direction drive unit in such a manner as to orient leftward, as viewed in a direction of one face of the sound collection apparatus, by orienting a trackball at the operation unit leftward, as viewed in a direction of one face of the sound collection apparatus.
Figure 6C:
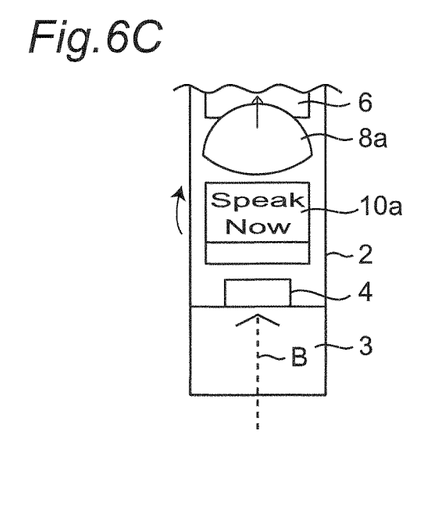
FIG. 6C is a view showing an operational example of a display unit that is moved by a direction drive unit in such a manner as to orient rearward or upward, as viewed in a direction of one face of the sound collection apparatus, by orienting the trackball at the operation unit rearward, as viewed in a direction of one face of the sound collection apparatus.

FIG. 6B is a view showing an operational example of the display unit 10a that is moved by the direction drive unit 22 in such a manner as to orient leftward, as viewed in a direction of one face 3 of the sound collection apparatus 2, by orienting the spherical member (the trackball) at the operation unit 8a leftward, as viewed in a direction of one face 3 of the sound collection apparatus 2. On the display unit 10a shown in FIG. 6B, a predetermined display content can be visually recognized with correction, as viewed in a direction indicated by an arrow A. Moreover, FIG. 6C is a view showing an operational example of the display unit 10a that is moved by the direction drive unit 22 in such a manner as to orient rearward or upward, as viewed in a direction of one face 3 of the sound collection apparatus 2, by orienting the spherical member (the trackball) at the operation unit 8a rearward, as viewed in a direction of one face 3 of the sound collection apparatus 2. On the display unit 10a shown in FIG. 6C, a predetermined display content can be visually recognized with correction, as viewed in a direction indicated by an arrow B.

Through operations in steps S34 to S36, if the display unit 10a is not oriented in a direction in which a predetermined display content can be visually recognized with correction, as viewed by the user 1, the operation with respect to the operation unit 8a is continued (NO in S37), and thereafter, the operations in steps S34 to S36 are repeated.

In contrast, through operations in steps S34 to S36, if the display unit 10a is oriented in a direction in which a predetermined display content can be visually recognized with correction, as viewed by the user 1, the operation with respect to the operation unit 8a is ended (YES in S37). At this time, the direction of the operation unit 8a detected by the direction detection unit 14 is once determined. Thereafter, the beam forming production unit 16 in the control unit 12 controls a microphone array so as to produce a beam according to the direction detected by the direction detection unit 14 (S38). Specifically, the beam forming production unit 16 controls the microphone array in such a manner as to improve sound collection directivity in the direction detected by direction detection unit 14. In this manner, the direction of a speaker (i.e., the user) 1 facing the display unit 10a in the sound collection apparatus 2 substantially accords with the direction of the beam produced by beam forming.

Subsequent to step S38, the sound collection unit 4 including the microphone array picks up a voice of the speaker (i.e., the user) 1. The control unit 12 converts the picked-up voice into data, and then, outputs it to the outside via the interface unit 20.

As described above, the voice of the speaker is picked up via the microphone having improved directivity by a simple operation.

[2-3. Effects and the Like]

As described above, in the present embodiment, the sound collection apparatus 2 is provided with: the operation unit 8a capable of visually indicating one direction and three-dimensionally and sequentially varying the direction; the sound collection unit 4 providing the directivity for sound collection; and the control unit 12. The control unit 12 includes the direction detection unit 14 for detecting the direction indicated by the operation unit 8a. The control unit 12 controls sound collection directivity of the sound collection unit 4 according to the directions detected by the direction detection unit 14.

In this manner, the sound collection apparatus 2 provides the optimum sound collection direction that is understandable by the user 1. The user 1 can face in a proper direction. Moreover, the user 1 can optimally operate the sound collection direction with ease.

Additionally, in the present embodiment, the sound collection unit 4 includes the plurality of microphones, and furthermore, the control unit 12 includes the beam forming production unit for controlling a beam by the microphone array having the plurality of microphones according to the directions detected by the direction detection unit 14, so as to vary the sound collection directivity.

In this manner, the sound collection apparatus 2 provided with the sound collection unit 4 forming the microphone array readily provides the user 1 with the optimum sound collection direction. Moreover, the user 1 can optimally operate the sound collection direction with ease.

Additionally, in the present embodiment, the sound collection apparatus 2 further includes the display unit 10a that indicates the direction and can be visually recognized only in the direction detected by the direction detection unit 14. The sound collection apparatus 2 further includes the direction drive unit 22 for controlling the orientation of the display unit 10a according to the direction detected by the direction detection unit 14. This enables the direction of the user 1 facing the display unit 10a in the sound collection apparatus 2 to more accord with the direction of the beam (directivity) by the microphone array with ease.

Using the present embodiment, the speaker (the user) can pick up his/her own voice with reduced surrounding noise.

Other Embodiments

The descriptions have been given above of the first and second embodiments exemplifying the technique disclosed in the present application. However, the technique in the present disclosure is not limited to these, and therefore, is applicable to other embodiments that are appropriately modified, replaced, added, or omitted. In addition, other embodiments may be achieved by combining the constituent elements described in the above-described first and second embodiments.

Then, other embodiments will be explained together below.

The orientation of the display unit 10a per se is varied based on the orientation by the operation unit 8a in the second embodiment. Here, the display unit 10a may be configured to display an image whose predetermined shape can be visually recognized with correction, only as viewed in the direction oriented by the operation unit 8a. That is to say, the display unit 10a may be configured to, for example, when the spherical member (i.e., the trackball) of the operation unit 8a is oriented leftward, as viewed in the direction of one face 3 of the sound collection apparatus 2, display an image whose predetermined shape can be visually recognized with correction, only as viewed leftward (as viewed in the direction of one face 3 of the sound collection apparatus 2).

Figure 8:
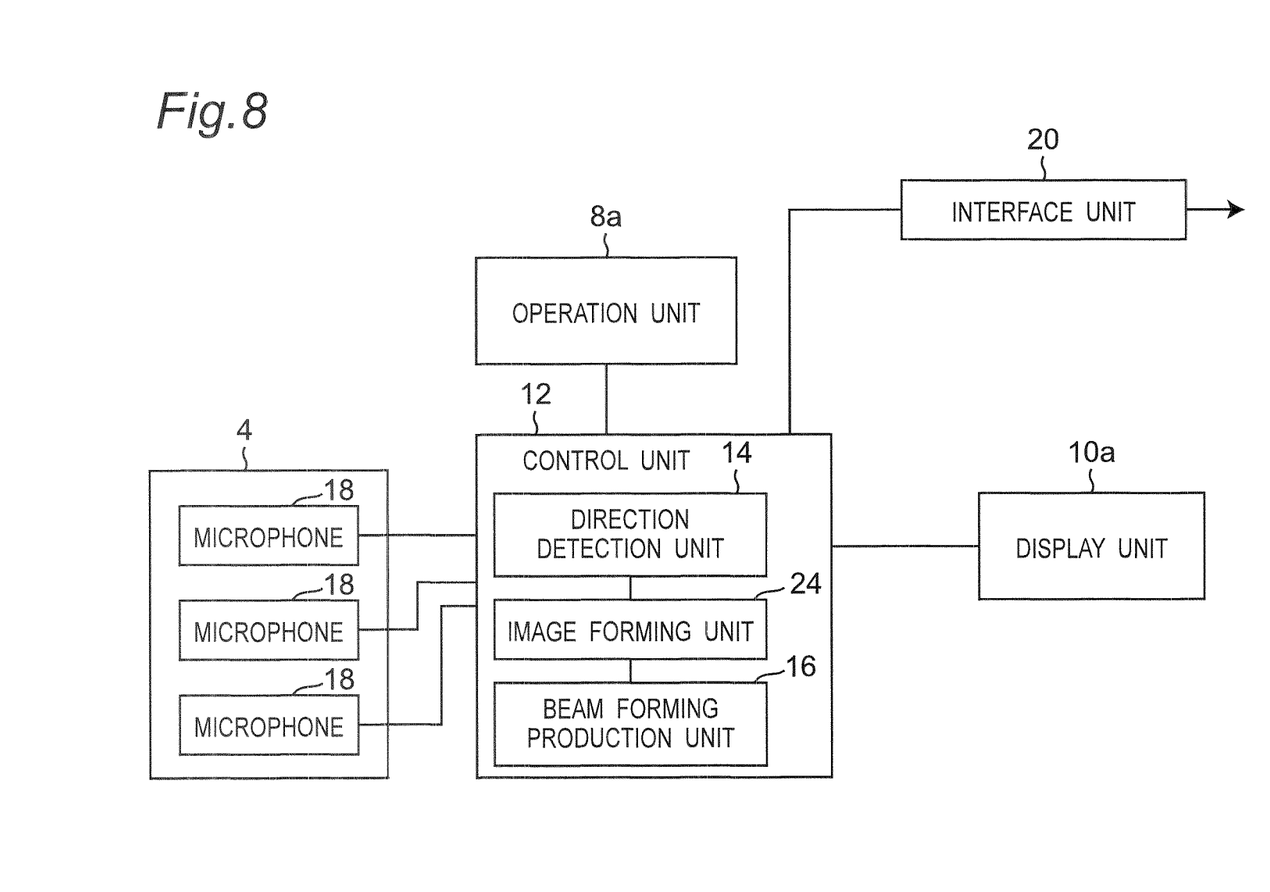
FIG. 8 is a block diagram partly illustrating a sound collection apparatus in another embodiment, the block being relevant to sound collection in the sound collection apparatus.

FIG. 8 is a block diagram illustrating the sound collection apparatus 2 in the above-described embodiment obtained by modifying the second embodiment. In comparison with the block diagram of FIG. 5, this sound collection apparatus 2 is not provided with the direction drive unit 22 but is additionally provided with an image forming unit 24 in the control unit 12. The image forming unit 24 forms an image whose predetermined shape is visually recognized with correction, only as viewed in a direction oriented by an operation unit 8a.

Figure 9:
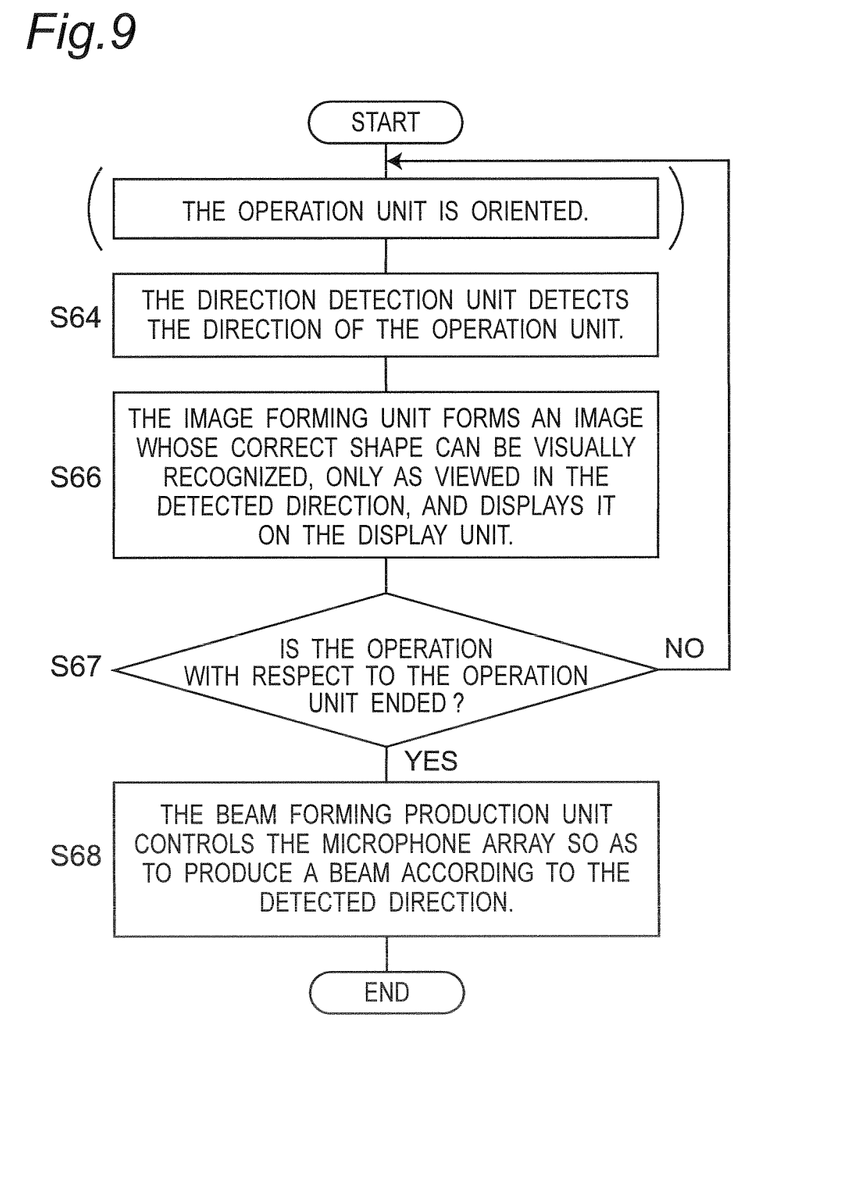
FIG. 9 is a flowchart illustrating operations from directing by the operation unit to producing a beam having high directivity in the sound collection apparatus in the other embodiment.

FIG. 9 is a flowchart illustrating operations from directing by the operation unit 8a to producing a beam having high directivity in the sound collection apparatus 2 in the above-described embodiment. In comparison with the flowchart of FIG. 7, the second step is defined not as "the direction drive unit 22 varies the orientation of the display unit 10a in such a manner as to orient the display unit 10a toward the direction of the operation unit 8a detected by the direction detection unit 14", but as "the image forming unit 24 forms an image whose predetermined shape can be visually recognized with correction, only as viewed in the direction of the operation unit 8a detected by the direction detection unit 14, and then, displays it on the display unit 10a". This embodiment not only produces an effect similar to that in the second embodiment but also achieves the simple sound collection apparatus 2 that is hard to malfunction because there is no need to dispose a mechanism for varying the orientation of the display unit 10a.

Here, although the beam forming has been described that it can sequentially vary the beam in the direction designated by the operation unit, a plurality of algorithms may be switched so as to vary the direction of the beam for the sake of simplification of the beam forming.

As described above, the embodiments have been described as the examples of the technique in the present disclosure. For this purpose, the attached drawings and the detailed description have been provided. As a consequence, the constituent elements described in the attached drawings and the detailed descriptions include not only constituent elements essential to solving a problem to be solved but also constituent elements that are not essential to solving a problem to be solved only for the sake of exemplifying the above-described technique. Therefore, although inessential constituent elements are described in the attached drawings and the detailed descriptions, they should not be identified as being essential.

Moreover, the above-described embodiments are adapted to exemplify the technique in the present disclosure, and therefore, they may be variously modified, replaced, added, or omitted within the scope of claims or its equivalent scope.

INDUSTRIAL APPLICABILITY

The present disclosure is applicable to the systems using the voices picked up via the microphones. More specifically, the present disclosure is applicable to voice recognition systems, automatic language translation systems, and the like.

The invention claimed is:

1. A sound collection apparatus comprising:
an operation unit having a three-dimensionally and sequentially variable input interface for adjusting an input direction;
a sound collection unit having a variable directivity of sound collection;
a display unit that can be visually recognized only in the input direction; and
a control unit,
the control unit including a direction detection unit configured to detect the input direction inputted by the operation unit,
the control unit controlling the directivity of sound collection of the sound collection unit according to the input direction detected by the direction detection unit to accord the collection directivity of the sound collection unit with the direction in which the display unit is recognized,
wherein the operation unit includes the display unit, and
wherein the operation unit has a cylinder of which an axial direction accords with the input direction, and has the display unit near the tip of the cylinder.

2. The sound collection apparatus according to claim 1, wherein the sound collection unit includes a plurality of microphones,
the control unit further including a beam forming production unit for controlling a beam by a microphone array including the plurality of microphones according to the input direction detected by the direction detection unit so as to vary collection sound directivity.

3. The sound collection apparatus according to claim 1, wherein the display unit visually indicates the direction.

4. The sound collection apparatus according to claim 3, further comprising a direction drive unit for driving the orientation of the display unit according to the input direction detected by the direction detection unit.

5. The sound collection apparatus according to claim 1, wherein the input direction is varied by a user operation of the cylinder.

6. The sound collection apparatus according to claim 1, wherein the direction of the operation unit is operated by a user, and
wherein the display unit is configured to be able to be visually recognized as viewed by the user in the direction.

* * * * *